Patented Aug. 2, 1938

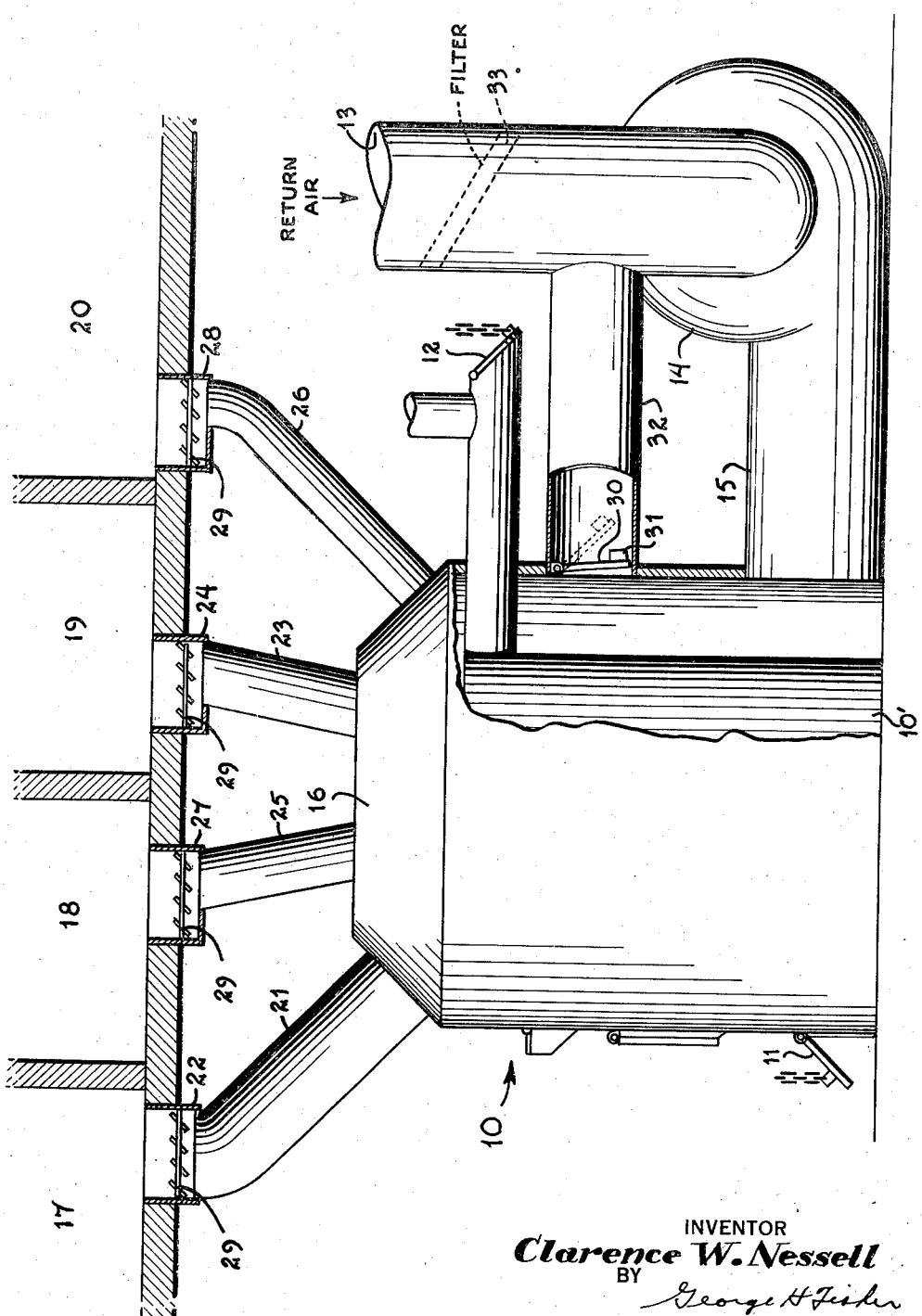

2,125,646

UNITED STATES PATENT OFFICE 2,125,646

AIR CONDITIONING SYSTEM

Clarence W. Nessell, Dayton, Ohio, assignor to Minneapolis-Honeywell Regulator Company, Minneapolis, Minn., a corporation of Delaware Application July 12, 1937, Serial No. 153,095

6 Claims. (Cl. 98—39)

The present invention relates to a system of air circulation through an air conditioning chamber and into a plurality of spaces to be conditioned, and while it is illustrated and described in connection with a warm air heating system, it is of course equally applicable to other forms of air conditioning systems.

The invention described and claimed herein is designed as an improvement or simplification of the system disclosed by application Serial No. 707,080, filed January 18, 1934, by Arthur C. Grant, and eliminates the necessity for using certain equipment which might be too expensive for a small home installation, while achieving the same desired results.

In a warm air heating system, it is usual to provide a warm air furnace or other means for heating the air, together with pipes or ducts for leading the heated air to the various compartments to be heated. It is well recognized that various compartments require varying volumes of heated air per unit of time by reason of differences in size, differences in heat loss and, in some instances, because it is desired to maintain varying temperatures in various compartments.

In order to obviate the necessity of separate controlling means for controlling the flow of air to each of the compartments, it has been usual to provide a single control responsive to the temperature of only one of the compartments whereby the temperature of that compartment is maintained at the desired point and to maintain the desired temperatures in the other compartments by arranging the ducts or pipes in such manner that the proper amount of heated air is distributed to each of these compartments. This is generally accomplished by providing ducts of different sizes and in some instances additional means such as individual dampers are also provided in order that the proportional amount of the total air delivered to each compartment in response to the control in the controlling compartment may be properly adjusted.

Such systems are satisfactory when all of the ducts are open so that the proper balance in the flow of air to all of the compartments can be maintained by reason of the aforementioned proper design of the ducts. However, it is often desired to block off the flow of air to one or more of the compartments. When this is done, approximately the same total volume of air is then available for a lesser number of compartments and inasmuch as the ducts have been arranged to give the proper flow of air to each compartment only when all of the ducts are open, the distribution or balance is upset. This means that while the main controlling compartment is maintained at the desired temperature, the other compartments may be maintained at temperatures which are either higher or lower than contemplated and desired.

One of the objects of the present invention is the provision of a system of distributing fluid to a plurality of points of use having different requirements in which the distribution system is arranged to give the proper distribution of fluid to all of the points of use when all of them are in operation, together with means for automatically maintaining the proper distribution to the remaining points of use when one or more of the points of use is rendered inoperative.

A further object of the invention is the provision of an air distribution system wherein air is adapted to be distributed through properly arranged ducts or pipes so that different desired flows or volumes of air are delivered to the desired points, together with means for automatically maintaining the same flow through those ducts still in operation when some of the ducts are closed off so as to prevent the flow of air therethrough.

Another object of the invention is the provision of a warm air heating system of the type wherein a plurality of ducts leading to a plurality of compartments to be heated are proportioned or arranged to give the desired flow or volume or proportion of air to each and every one of the compartments when all of the ducts are open to the passage of air and means for maintaining this proper proportion or flow or volume to those ducts still in operation when one or more of them is placed out of operation and the flow of air therethrough obstructed.

More specifically, an object of the present invention, is the provision of a fluid distribution system by which varying volumes of fluid are delivered per unit of time to a plurality of points of use having different volume requirements, and providing automatic means for maintaining the delivery pressure constant whereby when delivery of fluid to one of said points is obstructed, the volume delivered to the remaining points per unit of time remains constant.

Further objects of the invention will be found in the detailed description, the appended claims and the drawing.

For a more complete understanding of the invention, reference may be had to the following detailed description and the accompanying single drawing, which is a diagrammatic showing of one application of the instant invention.

Referring to this single drawing, the invention is shown as applied to a warm air heating system which includes a warm air furnace generally indicated at 10, having a combustion chamber 10' and a warm air heating chamber 16. The heat output of the furnace is shown as being controlled by the ordinary draft damper 11 and usual check damper 12. Air is supplied to the furnace 10 by means of a return pipe 13 which communicates with a blower 14, preferably electrically operated. The blower discharges this air into the furnace 10 through a pipe or duct 15. The air then flows through the furnace and into the usual warm air heating chamber 16 thereof, where the air is heated, whence it is led by suitable ducts or pipes to the rooms or compartments to be heated. A filter 33 is provided in the warm air pipe for cleaning the air before it enters the furnace. In the instant embodiment of the invention, four rooms 17, 18, 19 and 20 are illustrated. The room 17 requires more heat per unit of time than any of the other rooms, perhaps because of its exposure or size or the temperature which it is desired to maintain therein, so a large duct 21 connects with the air heating chamber 16 and a register 22 located in the room 17. The room 19 as shown requires a smaller amount of heat per unit of time as indicated by the fact that the duct 23 leading from air heating chamber 16 to the register 24 of room 19 is slightly smaller than the duct 21. In a similar manner, two progressively smaller ducts 25 and 26 lead from air heating chamber 16 to registers 27 and 28 located respectively in rooms 18 and 20. Each of the registers is provided with the usual shutter 29 whereby any one of the ducts 21, 25, 23 or 26 may be shut off so as to interrupt the flow of air therethrough and to the corresponding room 17, 18, 19 or 20.

With the arrangement thus far described, the ducts 21, 25, 23 and 26 have been proportioned in such manner that when all of them are open to the flow of air, the proper proportional part of the total air delivered by the blower 14 and heated by the furnace 10 will be delivered to each of the rooms. With no additional mechanism, if the register 22 leading to room 17 were shut off, the total amount of air delivered by blower 14 would thereupon be distributed to the three remaining rooms 18, 19 and 20. This would result in an increase in the velocity of the air flowing through the respective ducts 23, 25 and 26. Such an increase in velocity is undesirable for several reasons. For one thing, the velocity of air flowing into the room has a bearing upon the quickness of response upon the main controlling thermostat located in some one of the rooms with the result that changes in velocity of the air delivered to the rooms results in changes in the response of the heating system. Furthermore, an increased velocity may set up an increased circulation within the room itself to such an extent as to make the occupants thereof uncomfortable. Also, the velocity may increase to such an extent as to cause undesirable noises. Furthermore, and most important, is the fact that because the remaining three ducts 23, 25 and 26 have different sizes, and therefore different resistances, the distribution of air or the proportion of the total air distributed to each of the remaining rooms 18, 19 and 20 will change from that desired and contemplated in originally laying out the heating system so that the desired temperatures will not be maintained in those rooms which do not contain the control device.

To overcome these detrimental effects, I provide a by-pass 32 providing communication between the heating chamber and return pipe 13. Located at the junction between the by-pass 32 and the heating chamber is a damper 30 pivoted at its upper end and provided with a weight 31 at its lower end. This damper and its weight are designed to close the by-pass 32 when all the registers 29 are open. With the parts in the position shown in the drawing, all of the ducts 21, 25, 23 and 26 are open and the damper 30 is in closed position, preventing any flow of air through the by-pass 32, the air pressure being insufficient to open the damper. If one of the registers, such as 22, is closed, preventing flow of air through duct 21 into room 17, the pressure through the remaining ducts 25, 23 and 26 and in the heating chamber will tend to increase. This will cause damper 30 to move toward the dotted line position an amount sufficient to permit enough air to pass through by-pass 32 so that the pressure through the ducts 25, 23 and 26 will remain constant. In this manner there will always be a constant flow of air through whichever of the ducts 21, 25, 23 and 26 may happen to be open, so that the amount of air delivered to each room per unit of time always remains constant when its respective duct is open. It therefore follows that the proportion of air delivered to each of the rooms will likewise remain constant. It is contemplated that the draft damper 11 and the check damper 12, as well as the blower 14, will be controlled by a thermostat located in some one of the compartments 17, 18, 19 or 20 in any well-known manner, such as that disclosed in Edward F. Edgecombe, Jr. Patent Re. 15,531, which issued January 23, 1923.

Having described my invention in its preferred embodiment, I wish it to be understood that many changes can be made by those skilled in the art without departing from the spirit of the invention, and I therefore intend to be limited only by the scope of the appended claims.

I claim as my invention:

1. In an air conditioning system, an air conditioning chamber, a delivery duct connecting said chamber to a space to be conditioned, means for recirculating air through said chamber, duct, and space, said means including a fan having its outlet in communication with the chamber, a conduit through which return air from said space passes to the fan inlet, and a second conduit connecting said first conduit directly to said chamber, said second conduit forming a by-pass from said chamber to said fan inlet, means to adjust the effective area of said delivery duct, and means in said second conduit, responsive to a change in the effective area of said delivery duct, to change the area of said second conduit an amount sufficient to maintain the pressure of air through said delivery duct substantially constant at all times during operation of the system.

2. In an air conditioning system, an air conditioning chamber, a plurality of delivery ducts connecting said chamber to a plurality of spaces to be conditioned, means for recirculating air through said chamber, ducts and spaces to be conditioned, said means including a fan having its outlet in communication with the chamber, a conduit through which return air from said spaces passes to the fan inlet, and a second conduit connecting said first conduit directly to said chamber, said second conduit forming a by-pass from said chamber to said fan inlet, means to adjust the effective area of at least one of said ducts, a hinged damper in said second conduit, said hinged damper being arranged to change the effective area of said conduit in response to a change in the effective area of said delivery ducts an amount sufficient to maintain the air pressure in said delivery ducts substantially constant at all times during operation of the system.

3. In a heating system, in combination, a heating chamber, a plurality of delivery ducts connecting said chamber to a plurality of spaces to be heated, an inlet duct for said heating chamber, fan means arranged to draw air through said inlet duct, and force it through said chamber, delivery ducts, and into the spaces to be heated, means to adjust the effective area of at least one of said ducts, a by-pass from the heating chamber to the fan inlet, and means in said by-pass, responsive to a change in the effective area of any of said delivery ducts, to change the effective area of said by-pass an amount sufficient to maintain the pressure of air through said delivery ducts substantially constant at all times during operation of the system.

4. In a heating system, in combination, a heating chamber, a plurality of delivery ducts connecting said chamber to a plurality of spaces to be heated, an inlet duct for said heating chamber, fan means arranged to draw air through said inlet duct, and force it through said chamber, delivery ducts, and into the spaces to be heated, means to adjust the effective area of at least one of said delivery ducts, a by-pass from the heating chamber to the fan inlet, a hinged damper in said by-pass, said damper being arranged to change the effective area of said by-pass in response to a change in the effective area of said delivery ducts, an amount sufficient to maintain the air pressure in said delivery ducts substantially constant at all times during operation of the system.

5. In an air conditioning system, in combination, an air conditioning chamber, duct means connecting said chamber to a plurality of spaces to be conditioned requiring different amounts of conditioned air per unit of time, an inlet duct for said air conditioning chamber, fan means arranged to draw air through said inlet duct, and force it through said chamber and said duct means into the spaces to be conditioned, means to restrict the effective area of at least a portion of said duct means, a by-pass from the air conditioning chamber to the fan inlet, and means in said by-pass, responsive to a change in the effective area of said duct means, to change the area of by-pass an amount sufficient to maintain the pressure of air through said duct means substantially constant at all times during operation of the system.

6. In an air conditioning system, in combination, an air conditioning chamber, duct means connecting said chamber to a plurality of spaces to be conditioned requiring different amounts of conditioned air per unit of time, an inlet duct for said air conditioning chamber, fan means arranged to draw air through said inlet duct, and force it through said chamber and said duct means into the spaces to be conditioned, means to restrict the effective area of at least a portion of said duct means, a by-pass from the air conditioning chamber to the fan inlet, a hinged damper in said by-pass, said damper being arranged to change the effective area of said by-pass in response to a change in the effective area of said ducts, an amount sufficient to maintain the air pressure in said ducts substantially constant at all times during operation of the system.

CLARENCE W. NESSELL.